(12) United States Patent
Whitmer (10) Patent No.: US 11,003,546 B2
(45) Date of Patent: May 11, 2021

(54) RESTORE PROCESS USING INCREMENTAL INVERSION

(71) Applicant: EMC IP Holding Company LLC, Hopkinton, MA (US)

(72) Inventor: Ray David Whitmer, Pleasant Grove, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 268 days.

(21) Appl. No.: 16/122,688

(22) Filed: Sep. 5, 2018

(65) Prior Publication Data

US 2019/0004904 A1   Jan. 3, 2019

Related U.S. Application Data

(62) Division of application No. 14/578,172, filed on Dec. 19, 2014, now Pat. No. 10,120,765.

(51) Int. Cl.
    *G06F 11/14*   (2006.01)
    *G06F 16/21*   (2019.01)

(52) U.S. Cl.
    CPC ........ *G06F 11/1458* (2013.01); *G06F 16/219* (2019.01)

(58) Field of Classification Search
    CPC ............ G06F 11/1451; G06F 11/1458; G06F 11/1469; G06F 16/219
    See application file for complete search history.

(56) References Cited

U.S. PATENT DOCUMENTS

| | | | |
|---|---|---|---|
| 5,944,789 A * | 8/1999 | Tzelnic | G06F 12/0813 707/214 |
| 7,769,967 B2 | 8/2010 | Zhu et al. | |
| 7,873,601 B1 | 1/2011 | Kushwah | |
| 8,112,505 B1 | 2/2012 | Ben-Shaul | |
| 8,166,263 B2 | 4/2012 | Prahlad | |
| 8,200,926 B1 | 6/2012 | Stringham | |
| 8,285,682 B2 | 10/2012 | Oza | |
| 8,312,356 B1 | 11/2012 | Cousins | |
| 8,335,238 B2 | 12/2012 | Arimilli | |
| 8,447,826 B1 | 5/2013 | Manmohan et al. | |
| 8,489,671 B2 | 7/2013 | Lepeska | |
| 8,639,781 B1 | 1/2014 | Motes | |
| 8,725,687 B2 | 5/2014 | Klose | |
| 8,732,479 B1 | 5/2014 | Henriksen | |

(Continued)

OTHER PUBLICATIONS

U.S. Appl. No. 16/122,670, filed Sep. 5, 2018, Whitmer.

(Continued)

*Primary Examiner* — Cheyne D Ly
(74) *Attorney, Agent, or Firm* — Workman Nydegger (57) ABSTRACT

In one example, a method includes receiving, at a client where a version of a file is locally stored, an inversion patch concerning the local file version, the inversion patch including original content of one or more byte ranges that embrace changes reflected in the locally stored version of the file version that were made subsequent to creation of a target version of the file with which the locally stored file version is associated, unlocking the local file version, and applying the inversion patch to the unlocked local file version to create a restored file version that matches the target version of the file. The restored file version is then saved.

20 Claims, 6 Drawing Sheets

(56) References Cited

U.S. PATENT DOCUMENTS

| | | |
|---|---|---|
| 8,825,653 B1 | 9/2014 | Wang |
| 8,849,878 B1 | 9/2014 | Bachu |
| 8,904,125 B1 | 12/2014 | Elling |
| 8,954,663 B1 | 2/2015 | Klein |
| 9,003,458 B2 | 4/2015 | Gonder |
| 9,021,222 B1 | 4/2015 | Sadhu |
| 9,092,248 B1 | 7/2015 | Makin |
| 9,141,542 B1 | 9/2015 | Justiss |
| 9,680,954 B2 | 6/2017 | Park |
| 9,753,814 B1 | 9/2017 | Whitmer |
| 9,996,429 B1 | 6/2018 | Kumar et al. |
| 10,095,707 B1 | 10/2018 | Whitmer et al. |
| 10,095,710 B1 | 10/2018 | Whitmer |
| 10,102,080 B1 | 10/2018 | Gruszka et al. |
| 10,120,765 B1 | 11/2018 | Whitmer |
| 10,235,463 B1 | 3/2019 | Whitmer |
| 10,416,922 B1 | 9/2019 | Rangapuram et al. |
| 2001/0013102 A1 | 8/2001 | Tsuchiya |
| 2003/0158861 A1 | 8/2003 | Sawdon |
| 2004/0206982 A1 | 10/2004 | Lee |
| 2005/0251516 A1 | 11/2005 | Stakutis |
| 2007/0038815 A1 | 2/2007 | Hughes |
| 2007/0088760 A1 | 4/2007 | Okitsu |
| 2007/0094452 A1 | 4/2007 | Fachan |
| 2007/0185936 A1 | 8/2007 | Derk et al. |
| 2007/0276885 A1 | 11/2007 | Valiyaparambil |
| 2008/0005201 A1 | 1/2008 | Ting |
| 2008/0183767 A1 | 7/2008 | Zhu |
| 2009/0077263 A1 | 3/2009 | Koganti |
| 2009/0276592 A1 | 11/2009 | Reed |
| 2009/0313322 A1 | 12/2009 | Sheehan |
| 2010/0174745 A1 | 7/2010 | Ryan |
| 2010/0241726 A1 | 9/2010 | Wu |
| 2010/0268902 A1 | 10/2010 | Drobychev |
| 2010/0274784 A1 | 10/2010 | Acharya |
| 2010/0293147 A1 | 11/2010 | Snow |
| 2011/0059730 A1 | 3/2011 | Scriven et al. |
| 2011/0167435 A1 | 7/2011 | Fang |
| 2011/0185355 A1 | 7/2011 | Chawla |
| 2011/0191445 A1 | 8/2011 | Dazzi |
| 2011/0196822 A1 | 8/2011 | Zunger |
| 2011/0196833 A1 | 8/2011 | Drobychev |
| 2012/0005670 A1 | 1/2012 | Driesen |
| 2012/0215882 A1 | 8/2012 | Goto |
| 2012/0324056 A1 | 12/2012 | Miles |
| 2012/0331108 A1 | 12/2012 | Ferdowsi |
| 2013/0064370 A1 | 3/2013 | Gouge |
| 2013/0075380 A1 | 3/2013 | Albrech et al. |
| 2013/0097117 A1 | 4/2013 | Lasky |
| 2013/0151884 A1 | 6/2013 | Hsu |
| 2013/0212074 A1 | 8/2013 | Romanski |
| 2013/0226888 A1 | 8/2013 | Govind |
| 2013/0239129 A1 | 9/2013 | Kim |
| 2014/0006357 A1 | 1/2014 | Davis |
| 2014/0040286 A1 | 2/2014 | Bane |
| 2014/0095625 A1 | 4/2014 | Quan |
| 2014/0095813 A1 | 4/2014 | Shukla et al. |
| 2014/0101298 A1 | 4/2014 | Shukla et al. |
| 2014/0108755 A1 | 4/2014 | Lue |
| 2014/0108956 A1 | 4/2014 | Varenhorst |
| 2014/0181051 A1* | 6/2014 | Montulli ............ G06F 11/1464 707/679 |
| 2014/0201154 A1 | 7/2014 | Varadharajan |
| 2014/0201155 A1 | 7/2014 | Vijayan |
| 2014/0244937 A1 | 8/2014 | Bloomstein et al. |
| 2014/0279846 A1 | 9/2014 | Srinivasan |
| 2014/0279956 A1 | 9/2014 | Trimble |
| 2014/0304243 A1 | 10/2014 | Ramesh |
| 2014/0310245 A1 | 10/2014 | Novick |
| 2015/0046106 A1 | 2/2015 | Wade et al. |
| 2015/0089558 A1 | 3/2015 | Shimizu |
| 2015/0227533 A1 | 8/2015 | Goldstein |
| 2015/0293699 A1 | 10/2015 | Bromley |
| 2015/0293986 A1 | 10/2015 | Verge |
| 2016/0004718 A1 | 1/2016 | Lin et al. |
| 2016/0072886 A1 | 3/2016 | Lin et al. |
| 2016/0094585 A1 | 3/2016 | Shahbazian |
| 2016/0378528 A1 | 12/2016 | Zamir |
| 2017/0329543 A1 | 11/2017 | Slater |
| 2017/0329683 A1 | 11/2017 | Lien |
| 2018/0062956 A1 | 3/2018 | Schultz |

OTHER PUBLICATIONS

U.S. Appl. No. 16/264,403, filed Jan. 31, 2019, Whitmer.
U.S. Appl. No. 14/578,151, dated Jan. 4, 2019, Notice of Allowance.
U.S. Appl. No. 15/648,116, dated Jun. 13, 2019, Office Action.
U.S. Appl. No. 15/648,116, dated Dec. 10, 2020, Final Office Action.
U.S. Appl. No. 16/122,670, dated Sep. 26, 2019, Office Action.
U.S. Appl. No. 16/122,670, dated Mar. 13, 2020, Office Action.
U.S. Appl. No. 15/670,444, dated Nov. 26, 2019, Office Action.
U.S. Appl. No. 14/578,113, filed Dec. 19, 2014, Whitmer.
U.S. Appl. No. 14/578,151, filed Dec. 19, 2014, Whitmer.
U.S. Appl. No. 14/578,162, filed Dec. 19, 2014, Whitmer et al.
U.S. Appl. No. 14/578,168, filed Dec. 19, 2014, Whitmer.
U.S. Appl. No. 14/578,172, filed Dec. 19, 2014, Whitmer.
U.S. Appl. No. 15/648,116, filed Jul. 12, 2017, Whitmer.
U.S. Appl. No. 15/670,444, filed Aug. 7, 2017, Whitmer.
Symantec, Difference between synthetic backup/optimised synthetic backup and virtual synthetic backup, created Nov. 22, 2012, symantec.com, http://www.symantec.com/connect/forums/difference-between-synthetic-backup-optimised-synthetic-backup-and-virtual-synthetic-backup.
U.S. Appl. No. 14/578,151, dated Feb. 8, 2017, Office Action.
U.S. Appl. No. 14/578,162, dated Feb. 10, 2017, Office Action.
U.S. Appl. No. 14/578,113, dated May 3, 2017, Office Action.
U.S. Appl. No. 14/578,168, dated May 11, 2017, Notice of Allowance.
U.S. Appl. No. 14/578,151, dated Jul. 11, 2017, Office Action.
U.S. Appl. No. 14/578,162, dated Aug. 15, 2017, Office Action.
U.S. Appl. No. 14/578,172, dated Oct. 18, 2017, Office Action.
U.S. Appl. No. 14/578,113, dated Nov. 16, 2017, Final Office Action.
U.S. Appl. No. 14/578,151, dated Jan. 10, 2018, Final Office Action.
U.S. Appl. No. 14/578,162, dated Feb. 26, 2018, Final Office Action.
U.S. Appl. No. 14/578,113, dated Feb. 26, 2018, Advisory Action/Interview Summary.
U.S. Appl. No. 14/578,151, dated Apr. 9, 2018, Office Action.
U.S. Appl. No. 14/578,113, dated May 24, 2018, Notice of Allowance.
U.S. Appl. No. 14/578,172, dated May 31, 2018, Notice of Allowance.
U.S. Appl. No. 14/578,162, dated Jun. 7, 2018, Notice of Allowance.
U.S. Appl. No. 15/648,116, dated May 14, 2020, Office Action.
Beaty et al., Desktop to cloud transformation planning, International Symposium on Parallel and Distributed Processing (IPDPS), pp. 1-8. (Year: 2009).
Miller et al, Virtualization: virtually at the desktop, SIGUCCS '07: Proceedings of the 35th annual ACM SIGUCCS fall conference Oct. 2007 pp. 255-260. (Year: 2007).

* cited by examiner

RESTORE PROCESS USING INCREMENTAL INVERSION

RELATED APPLICATIONS

This application is a divisional of, and hereby claims priority to, U.S. patent application Ser. No. 14/578,172, entitled RESTORE PROCESS USING INCREMENTAL INVERSION, and filed on Dec. 19, 2014. All of the aforementioned applications are incorporated herein in their respective entireties by this reference.

FIELD OF THE INVENTION

Embodiments of the present invention generally concern mechanisms and processes for restoring backed up data. More particularly, at least some embodiments of the invention relate to systems, hardware, computer-readable media, and methods for incrementally restoring backed up data.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Increasingly, entities have chosen to back up their important data using cloud based storage. The cloud based approach to backup has proven attractive because it can reduce, or eliminate, the need for the entity to purchase and maintain its own backup hardware. Cloud based storage is also flexible in that it can enable users anywhere in the world to access the data stored in the cloud datacenter. As well, the user data is protected from a disaster at the user location because the user data is stored in the cloud data center, rather than on backup hardware at the user location.

While advantageous in certain regards, the use of cloud based storage can present some problems. Some of these problems are related to the way in which data is stored. To illustrate, relatively large files are often backed up in cloud based storage. Because it is typically not feasible to back up an entire new version of the file each time the file is changed, incremental backups can be employed after the baseline backup of the file is performed. The incremental backups reflect only the changed portions of the file. Such incremental backups may tend to accumulate over time because the large size of the baseline file is a disincentive to performing a full backup of all the changes.

If a locally stored version of the file experiences problems, an earlier version of the file can be restored locally using the original backup version and the accumulated incremental backups. While relatively straightforward in principle, this approach to restoration is problematic as a practical matter.

In particular, performance of a full local restore would first require local restoration of the baseline file that was initially backed up. Depending upon the size of the file and the capacity of the communication line connecting the user with the datacenter, this process can be unacceptably long. For example, it can take a significant amount of time, and communication bandwidth, to restore large files such as a database, mailbox, or virtual machine disk file. Once the baseline backup is fully restored, the various incrementals would then have to be applied to that backup in order to locally obtain a recent version of the file. This process, as well, can be quite lengthy. In particular, depending upon the number and size of incrementals, which could span a period of months, or longer, application of the incrementals to the restored baseline may be quite time consuming.

In light of problems and shortcomings such as those noted above, it would be useful to be able to locally restore a file without the necessity of transmitting and restoring the entire baseline backup of the file. As well, it would be desirable to be able to locally restore a particular version of the file. Finally, it would be useful to be able to locally restore a file using information that is based on the incremental backups of that file.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern systems, hardware, computer-readable media and methods for data restoration. Some particular example embodiments are concerned with the use of incremental backup information to locally restore a particular version of a file without the need to transmit or restore the baseline backup of that file. Such embodiments may be referred to as performing an incremental inversion process.

In brief, an incremental inversion process takes into account the byte ranges of tracked changes in the individual incremental patches or backups, which may also be tracked by the filter driver of the backup application, and searches prior incremental backups to find the original bytes in these ranges before the incremental backup that changed them. In this way, an effective incremental patch can be created that moves through local and incremental changes in reverse chronological order and incrementally transforms the local file version from the most recent to a less recent copy, rather than transforming the local file version by progressing from the least recent to a more recent copy.

This approach to restoration enables ready use of a local copy of the most recent version of the file to produce an earlier version instead of having to redownload all byte ranges in order to recreate a file as it existed, for example, one or more days previously, that is substantially the same as the current version of the file. Thus, there is no need to transmit or restore the entire baseline backup of the file in order to obtain a particular version of the file locally, nor is there a need to examine all of the incremental backups leading up to the desired version of the file.

A. Example Operating Environments

In general, embodiments of the invention may include and/or be implemented in an operating environment that includes one or more clients and one or more backup servers. As used herein, the term client is intended to have broad scope and embraces, among other things, any system, device, or combination of those, by way of which direct access to cloud based storage can be achieved. As such, one or more clients may be in a cloud system, and/or one or more clients may be located at a customer site. Similarly, the term backup server is intended to have broad scope, and embraces, among other things, any backup server and associated storage device or system that are located remotely relative to a client. As such, one or more backup servers may be part of a cloud based storage system, such as a cloud datacenter for example.

Figure 1:
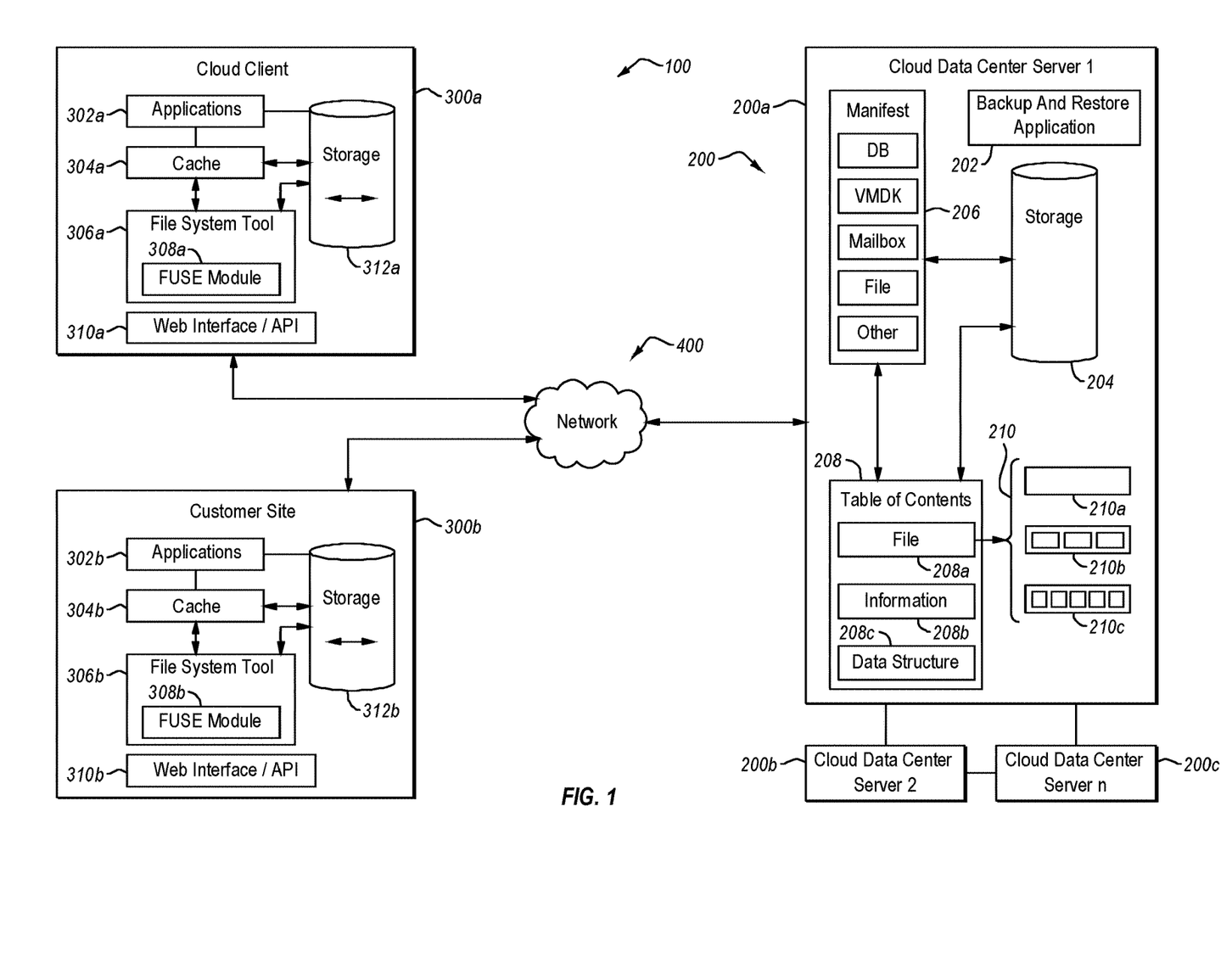
FIG. 1 is directed to aspects of an example operating environment for at least some embodiments.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a cloud datacenter 200 that may include one or more cloud datacenter servers, such as datacenter servers 200a, 200b and 200c. For the purposes of the discussion, only datacenter server 200a will be discussed but it should be understood that datacenter servers 200b and 200c may be similar, or identical, to datacenter server 200a in terms of operation and/or configuration. In at least some embodiments, two or more of the datacenter servers 200a-200c can communicate with each other, although that is not required. In general, the datacenter server 200a is implemented as a backup server that is able to communicate with one or more clients 300a and 300b, either directly or by way of an a communications network 400, to transmit data to, and receive data from, the clients 300a and 300b. Examples of backup servers include, but are not limited to, the EMC Avamar server, and the EMC NetWorker server.

With continued reference to FIG. 1, further details are provided concerning the example datacenter server 200a. As indicated, the datacenter server 200a may include a backup and restore application 202 that cooperates with a file system tool, discussed below, residing on one or more clients such as clients 300a and 300b, to restore requested data to the clients. The datacenter server 200a also includes, or has access to, storage 204 that stores backup data for one or more clients. The data stored for each client can include one or more backups of that client, or a portion of that client.

To facilitate management of backup and restore processes, including the generation and presentation of virtual synthetics, the datacenter server 200a may also include a manifest 206 and a table of contents 208. A manifest 206 and table of contents 208 can be provided on any number of different bases including, for example, for each client, or for each backup of a client or client file. It should be noted that metadata concerning data residing at the datacenter is not required to also reside at the datacenter. For example, the table of contents 208 and/or manifest 206 can, more generally, be stored anywhere that is accessible by a file system tool, examples of which are discussed in more detail below.

With reference first to the manifest 206, the manifest 206 may be generated at the time a backup is created. In general, the manifest 206 may take the form of a listing of various types of information and data structures that have been backed up. Thus, in the illustrated non-limiting example, the manifest 206 lists a database, a .VMDK file, a mailbox, a file, and one or more various other backed up information and/or data structures. In general, any material(s) capable of being backed up and restored can be included in the manifest 206, and there are no constraints, for example, as to the type, size and number of information and data structures that can be reflected in the manifest 206. In at least some particular embodiments, relatively large files such as virtual machine disk files and mailbox files are listed in the manifest 206.

As noted earlier, the cloud datacenter server 200a may also include a table of contents 208. In general, the table of contents 208 serves to keep track, such as by mapping for example, of incremental changes that have been made to information listed in the manifest 206 and stored by the datacenter server 200a. For example, the table of contents 208 may include entries 208a, 208b and 208c that including information concerning, respectively, a file, information, and a data structure. Each of the entries can include various types of information concerning the data with which that particular entity is associated.

For example, an entry 208a may include a mapping that indicates the byte range, in storage, that is spanned by the file to which the entry 208a corresponds. As well, the mapping could also indicate other information, such as where the bytes of that byte range are stored, the type of compression and/or encryption used on those bytes, and any other information concerning the bytes of the file.

As well, the table of contents 208 may provide mapping to one or more incremental changes 210, or simply incrementals, to any of the entries in the table of contents 208, such as the entry 208a for example. That is, the table of contents 208 can reference one, some, or all, of the incremental changes that have been made over time to the file to which entry 208a corresponds. Among other things, this approach can enable a user to request a file, or other information, as that file or information existed at a particular point in time. In the particular example of FIG. 1, the table of contents 208 maps to the original file version 210a, and also maps to first and second incrementals 210b and 210c, respectively. Each of the incrementals 210 represents a different set of changes to the file to which entry 208a corresponds, and each of the incrementals 210 corresponds to a different respective point in time. Moreover, and as suggested in FIG. 1, each of the incrementals 210 is relatively smaller in size than the file to which the incremental 210 corresponds. Thus, when a file version is requested, the entire file need not be sent to the requestor. Instead, only the incremental changes through the date of interest are required to be sent.

With continued reference to FIG. 1, and as noted earlier, a cloud datacenter including one or more datacenter servers may communicate with one or more clients, two examples of which are denoted at 300a and 300b, respectively. As the clients 300a and 300b may share a number of similarities, only client 300a is addressed in the following discussion.

Among other things, the client 300a may include one or more applications 302a, a local cache 304a, a file system tool 306a that includes an interface module 308a, a web interface/API 310a and local storage 312a. With reference first to the applications 302a, example applications include, but are not limited to, word processing, email, a backup and restore client, database management, and any other application(s) capable of generating data that can be backed up at the cloud datacenter 200. As discussed in more detail elsewhere herein, one or more of the applications may directly or indirectly request data from the cloud datacenter 200 and the requested data can be stored in the local cache 304a when received by the file system tool 306a of the client 300a. In at least some instances, requests for data from the cloud datacenter 200 can be formulated by the file system tool 306a and transmitted by way of a web interface/API 310a/310b using an application program interface (API) such as the RESTful (REpresentational State Transfer) HTTP-based API, although other mechanisms can be used instead of the RESTful HTTP-based API. More generally, backend storage can be any cloud API that supports requesting specific ranges of content from a datacenter or other data repository.

The interface module 308a, which could take the form of a plug-in, can be used by the file system tool 306a to provide the user with a representation of a virtual file system that includes representations of the files of the user that are stored at the cloud datacenter 200. That is, the file system tool 306a can present a standard file system interface to a user at the client. This interface may have both visual and functional aspects. To briefly illustrate, the representation could appear to the user as a display of a virtual file structure. In one particular example, discussed in more detail in a related application, the interface module 308a may take the form of a file system driver, such as the Filesystem in Userspace (FUSE) operating system mechanism, although other drivers, mechanisms and interfaces could alternatively be employed. As well, one example of a file system tool 306a may be referred to herein as a Data Protection Cloud File System (DPCFS).

The file system tool 306a operates in connection with the interface module 308a. For example, the file system tool 306a not only requests data needed by the user but, responding to user commands provided by way of the interface module 308a, the file system tool 306a can perform or cause the performance of a variety of file system operations, examples of which include, but are not limited to, open, view, search, read, write, move, and delete. In addition to these operations, the file system tool 306a can perform, or cause the performance of, a variety of other operations not specifically requested by the user. Such other operations can include, for example, creating a manifest, submitting changes to an existing manifest such as manifest 206, submitting changes to a table of contents such as the table of contents 208, and defining and transmitting a request to provide and mount a remote file system that represents user data. Yet other operations that can be performed by the file system tool 306a include, for example, compression, encryption, decompression, decryption, and deduplication.

B. Example Host Configuration

Figure 2:
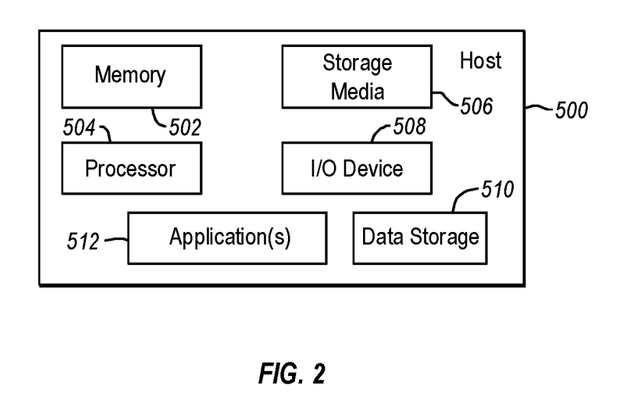
FIG. 2 is directed to an example implementation of a computing device, such as a host, that may be employed with at least some embodiments.

Any one or more of the clients 300a, 300b, and cloud datacenter server 200a can take the form of a physical computing device, one example of which is denoted at 500. In the example of FIG. 2, the computing device 500 includes a memory 502, one or more hardware processors 504, non-transitory storage media 506, I/O device 508, and data storage 510. As well, one or more applications 512 are provided that comprise executable instructions. Such executable instructions can take the form of one or more of a backup application, and a backup client, for example.

C. General Aspects of a Backup Scheme

Figure 3:
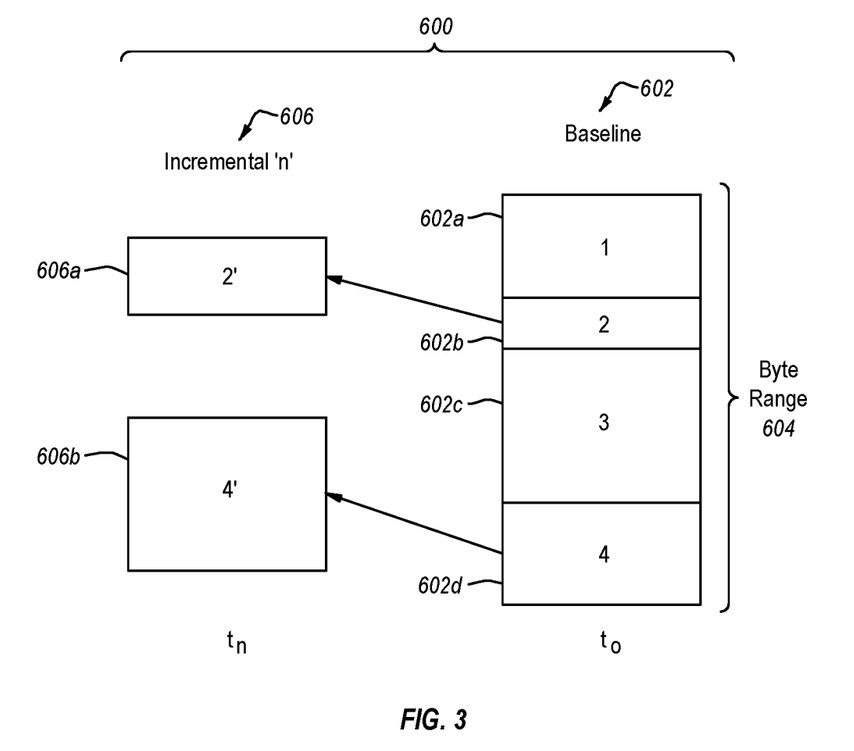
FIG. 3 is an example of a scheme for backing up data.

With attention now to FIG. 3, details are provided concerning an example scheme for backing up data. The scheme can be implemented in connection with a backup history. As noted elsewhere herein, embodiments of the invention can be advantageous insofar as they enable a client to directly access datacenter backup data, such as after a disaster has occurred, while avoiding the need to download entire files or other datasets to the client from the datacenter. More particularly, a user may only have to download parts of a dataset of interest.

In the example of FIG. 3, a backup history for a dataset, which could be a file, a file structure, a byte range, or any other dataset of any size, is indicated generally at 600. In general, the backup history 600 includes a baseline dataset 602 that in this illustrative example includes four blocks, namely, 602a (1), 602b (2), 602c (3) and 602d (4). In some embodiments, these blocks may be referred to as chunks of data. As well, the pieces or chunks have data may have a size that is variable. The four blocks of data 602a-602d collectively define a corresponding data range, which can be expressed in terms of bytes, namely, a byte range 604, but can alternatively be expressed in any other suitable terms. The baseline dataset 602 reflects the content of a particular dataset as that particular dataset was initially backed up at a datacenter, such as a cloud datacenter for example. This initial backup of the baseline dataset 602 is indicated as having occurred at time $t_0$.

Over a period of time, one or more changes may be made, by an application for example, relative to the baseline dataset 602. Each change can be backed up at the datacenter, so that the changes accumulated over time collectively define the backup history 600 associated with the baseline dataset 602. As indicated in FIG. 3, the entire updated dataset need not be stored. Instead, only the changes to the preceding version of the dataset are stored, in a form referred to as an incremental backup, or simply an incremental. Thus, the amount of storage space required to save the backup history 600 is significantly smaller than if updated versions of the entire baseline dataset 602 were required to be stored.

Any number 'n' of incrementals associated with the baseline dataset 602 can be created and stored. In the example of FIG. 3, an incremental 'n' is stored at the datacenter at a time $t_n$ that is subsequent to time $t_0$ when the baseline dataset 602 was stored. The incremental 'n' includes only two blocks, namely, blocks 606a and 606b. This reflects the fact that changes have been made to only two blocks associated with the baseline dataset 602. In particular, the changed version of block 602b (2) is block 606a (2') and the changed version of block 602d (4) is block 606b (4'). FIG. 3 also indicates that the relative size of the blocks can change as modifications, reflected by incremental 'n,' are made.

As the foregoing example illustrates, and discussed in further detail below, a user requesting access to a dataset as it existed at time $t_n$ need only be sent blocks 606a and 606b from the datacenter, since no changes have been made, as of time $t_n$, to the other blocks associated with the baseline dataset 602.

D. Aspects of an Example Backup Scheme

Figure 4:
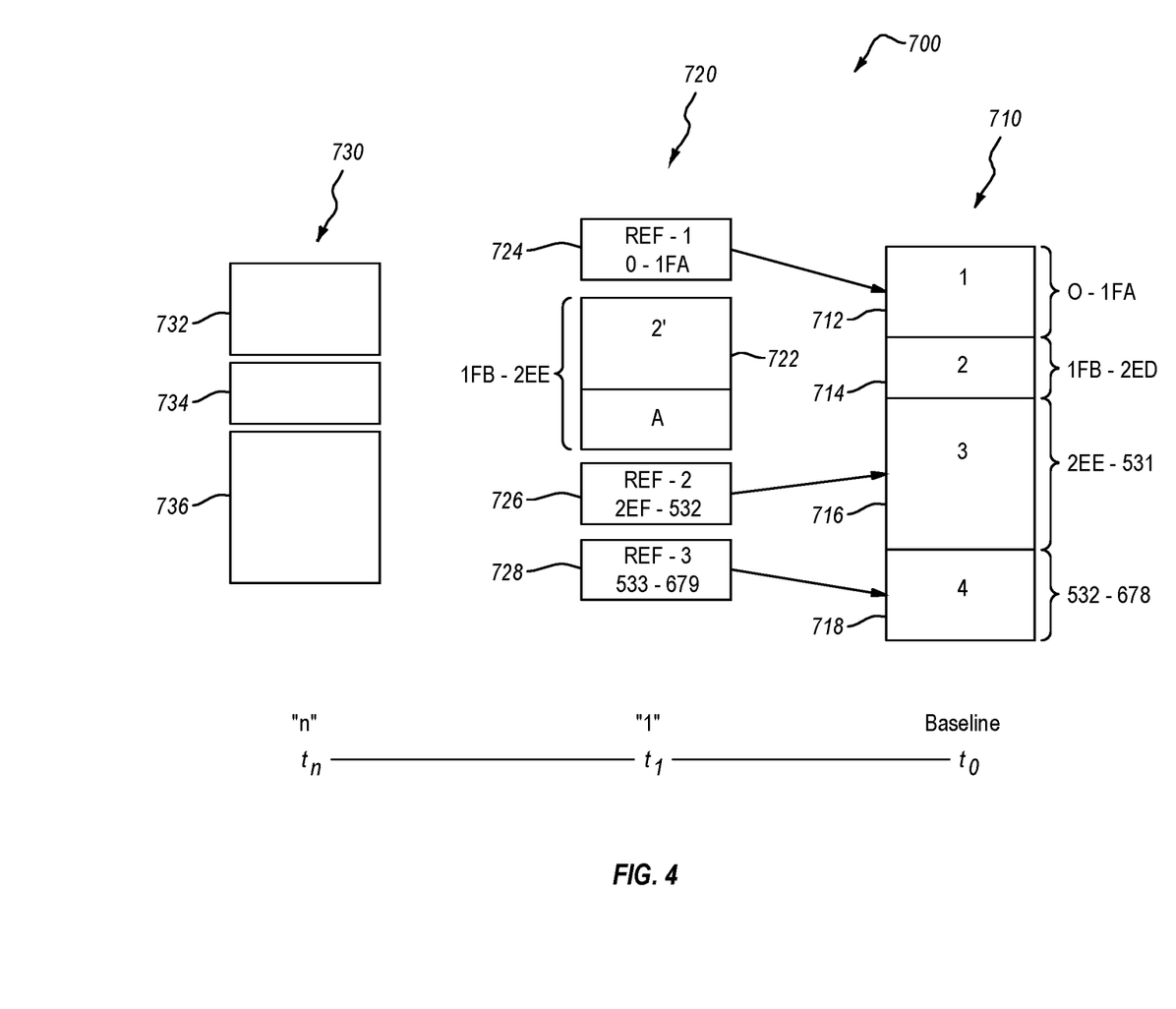
FIG. 4 discloses aspects of a particular embodiment of a scheme for backing up data that includes one or more incrementals and associated reference blocks.

With reference now to FIG. 4, a backup history 700 of a baseline dataset 710 is graphically displayed. In general, the backup history 700 can include any number of incrementals. In the example of FIG. 4, a first incremental 720 and an 'nth' incremental 730 are disclosed. As noted in the discussion of FIG. 1, the baseline dataset 710, first incremental 720, and 'nth' incremental 730 may each be listed in a table of contents at the datacenter server. As such, the tables of contents may reflect a complete backup history 700 of a dataset, which must include a baseline dataset 710. The baseline dataset 710 can be considered to have been stored at time $t_0$, the first incremental 720 stored at time $t_1$ subsequent to time $t_0$, and the 'nth' incremental 730 stored at time $t_n$ subsequent to time $t_1$.

The baseline dataset 710 in this example includes four pieces, which can be bytes, blocks, chunks, or any other pieces, 712, 714, 716 and 718 of data, and the baseline dataset. For the purposes of the discussion, the four portions will be referred to as blocks, but the scope of the invention is not limited to blocks. The baseline dataset 710 can include blocks 712-718 of the same sizes, or different sizes. In the illustrated example, blocks 712 and 718 are the same size, while block 714 is smaller than blocks 712 and 718, and block 716 is larger than blocks 712 and 718. Similarly, first incremental 720 includes block 722 and reference blocks 724, 726 and 728, and incremental 730 includes block 732, reference block 734 and block 736. The blocks 712-718 of the baseline dataset 710, as well as the blocks of each of the incrementals 720 and 730, are independent of each other and, as such, can be encrypted, decrypted, compressed, decompressed, and/or otherwise processed separately from each other.

As also indicated in the example of FIG. 4, and with continued reference to the baseline dataset 710, each of the blocks 712-718 has an associated start and end that, in general, collectively indicate the size and location of the associated block. Thus, block 712 starts at 0 and extends to 1FA, block 714 adjacent to block 712 starts at 1FB and extends to 2ED, block 716 adjacent to block 714 starts at 2EE and extends to 531, and block 718 adjacent to block 716 starts at 532 and extends to 678.

At some point after the backup of the baseline dataset 710, a first incremental 720 may be created at a client and backed up at the datacenter server. This first incremental 720 can be created, for example, when a user on a client system modifies a database, or uses an application to modify a file associated with that application, and then backs up the modifications at the datacenter.

In general, and as discussed in more detail below, incrementals such as the first incremental 720 can be considered as a new file that is created based on user changes associated with one or more blocks of a baseline dataset, such as the baseline dataset 710. The incrementals generally have at least two types of components, namely, one or more new/modified blocks created by a user, and one or more reference blocks. The modified blocks are changed versions of blocks that exist in the baseline dataset. New blocks added by the user, and not associated with any block existing in the baseline dataset, can also be included in the incremental. The reference blocks, which require only negligible storage space, are not blocks of data but simply point to corresponding blocks of a prior baseline or incremental dataset. Thus, the size of a given incremental can be relatively smaller than the baseline dataset with which that incremental is associated.

Briefly, an incremental can be restored when a user at a client system requests, from the datacenter, a data range that embraces the incremental. In response to the request, the modified/new blocks of the incremental are retrieved. Additionally, the reference blocks in the incremental are consulted to identify corresponding blocks of the baseline dataset so that those blocks can then be retrieved as well.

With continued reference now to FIG. 4, further details are provided concerning structures and operations concerning incrementals and a baseline dataset with which those incrementals are associated.

In the example of FIG. 4, the first incremental 720 does not include any changes relative to block 712 of the baseline dataset 710. Accordingly, the first incremental 720 includes only a reference block 724 that points to the location of block 712 in the baseline dataset 710. This reference block is designated REF 1 and identifies the range of block 712, namely, 0-1FA, so that when there is a client request for the first incremental 720, the datacenter is able to locate and return block 712 as part of the response to that request.

In contrast with the circumstance concerning block 712, the first incremental 720 includes a change relative to block 714. In the particular example of FIG. 4, block 722 of the first incremental 720 includes not only the content of block 714 but also the additional data 'A' that was added as a result of a client operation. As a result of the inclusion of data 'A,' block 722 is larger than block 714, although blocks of an incremental can also be smaller than their counterpart blocks in a prior incremental or baseline dataset 710, such as when a user removes data from a block of a dataset.

As such, block 722 reflects a change relative to block 714, although block 714 itself is not modified as a result of the creation or storage of the first incremental 720. Block 722 also reflects that fact that blocks can be variable in size, since block 722 is larger than block 714. Depending upon the nature of the modification made at the client, block 722 could instead be smaller than block 714.

In effect, and as shown in FIG. 4, block 722 replaces block 714, at least for the purposes of fulfilling a request for a dataset that reflects the first incremental. Thus, when the first incremental 720 is returned to a client in response to a request from that client, block 722 will be returned instead of block 714. If, on the other hand, a request were made for the baseline dataset 710, block 714 would be returned rather than block 722.

With continued reference to FIG. 4, it can be seen that while block 714 of the baseline dataset 710 extends from 1FB-2ED, block 722 of the first incremental 720, which includes the additional data 'A' extends further, namely, from 1FB-2EE in the first incremental 720. As a result, the location of the data range in the first incremental 720 that corresponds with block 716 is shifted, or offset, by the size of the difference between block 714 and block 722. Because of this shift, the location of the data range in the first incremental 720 that corresponds with block 716 is 2EF-532, though the data of block 716 actually exists at 2EE-531 in the baseline dataset 710. Thus, if a client requested range 2EF-532, an incomplete and/or incorrect dataset would be returned because that range in the baseline dataset 710 includes portions of two different blocks, namely, blocks 716 and 718.

In light of circumstances such as those discussed above, the offset imposed by block 722 must be accounted for so that a request for the first incremental 720 will return the correct block(s) from the baseline dataset 710. Accordingly, a reference block 726 is provided in the first incremental 720. This reference block is designated REF 2 and correlates the range of the first incremental 720 that corresponds to block 716, namely, 2EF-532, with the actual location of block 716 in the baseline dataset, namely, 2EE-531. Thus, when there is a client request for the first incremental 720, the datacenter is able to use reference block 726 to locate and return block 716 from the baseline dataset 710 as part of the response to that request. It can be seen from FIG. 4 that reference block 728, designated REF 3, similarly correlates the range of the first incremental 720 that corresponds to block 718, namely, 533-679, with the actual location of block 718 in the baseline dataset, namely, 532-678.

D. Example Request and Retrieve Methods

Figure 5:
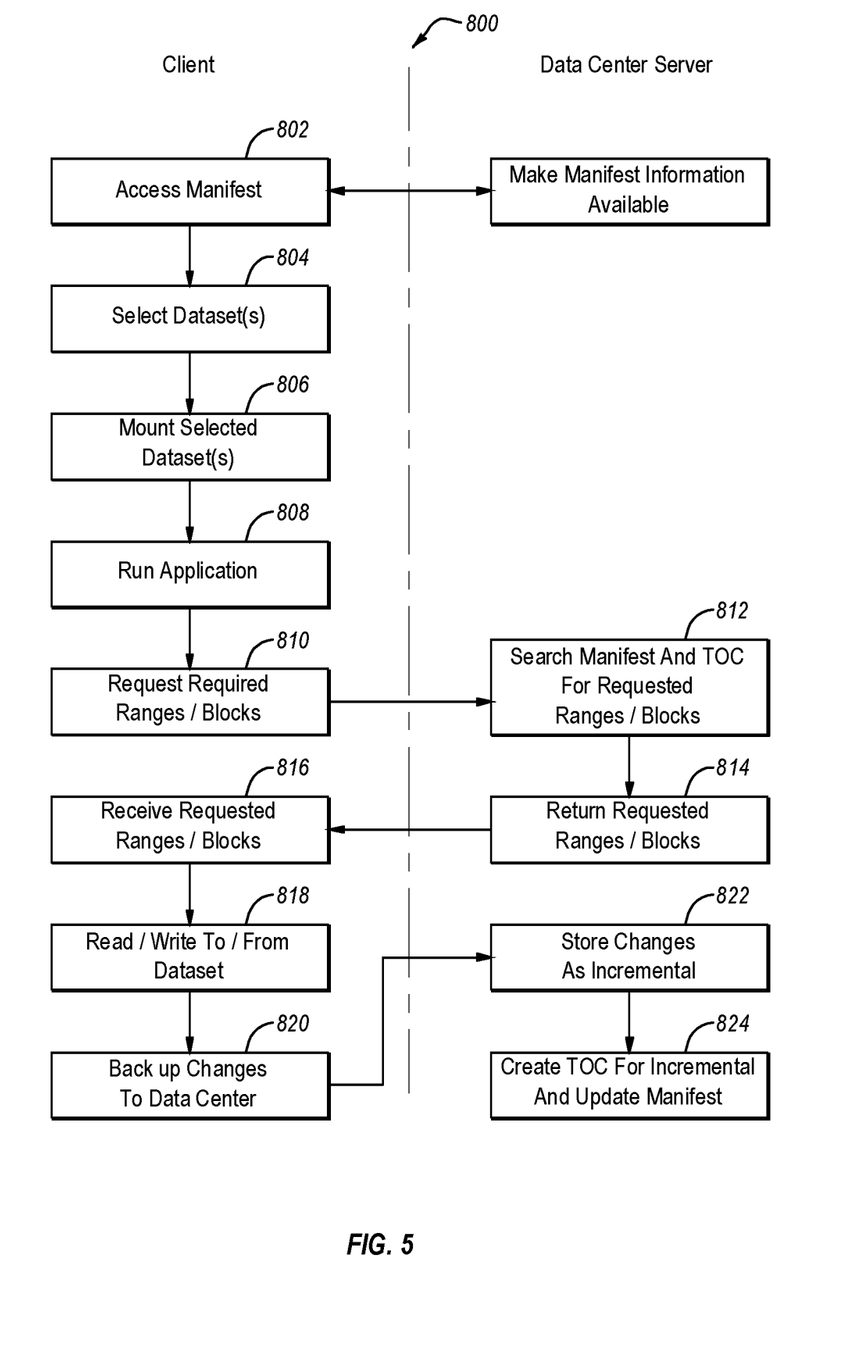
FIG. 5 is a flow diagram disclosing aspects of an example method for storing data.

With reference now to FIG. 5, further details are provided concerning a method 800 for the performance, by cooperation of the client and datacenter server, of file system operations, and concerning the associated interaction between the client and the datacenter server. It should be noted that as the term 'operations' is used herein, that term is intended to be broad in scope. As such, operations are not necessarily concerned only with modifications to a dataset, but may relate to manipulations of the dataset, such as restore operations, that do not involve changes to the content of the dataset, such as moving or renaming a dataset without modifying the dataset content. As another example of operations that can be performed in connection with embodiments of the invention, a dataset such as a .VMDK file may not be modified, but simply locally restored, such as by being mounted on a client, so that the user can use that .VMDK file to locally boot the VM to which the .VMDK file pertains. This process of local restoration may be performed, for example, when the local copy of the .VMDK file is not working properly, or at all. Other example operations concerning datasets, such as files for example, are disclosed elsewhere herein.

The method 800 can begin at 802 when a user at a client accesses a manifest, by way of a browser for example, to view the available version(s) of datasets, such as files, that are listed in the manifest. The user can then select 804 the desired dataset(s) from the manifest. The dataset(s) can be selected based on various criteria. One such criterion is a particular cutoff date/time. In particular, the user can specify that he would like all datasets as they existed as of the cutoff date/time. As another example, the user can specify that he would like all datasets created before, or after, a particular time. A file system tool, embodiments of which are disclosed herein, is then used to mount 806 the selected dataset(s) at the client. In some instances at least, all of the datasets listed in the manifest can be mounted. The mounted datasets can include incrementals and/or a baseline dataset.

Once the dataset(s) of interest are mounted at the client, the user opens and runs 808 an application in anticipation of performing one or more operations concerning the mounted dataset(s), such as a file for example, with which the application is associated. As part of the operations of the application, the application can access various mounted datasets as virtual synthetics. Thus, a file system request by the application can be translated by the file system tool into a request 810 for particular byte ranges or blocks of a mounted dataset is transmitted to the datacenter server by way of a suitable interface, such as a REST API for example. In some instances, a number of additional bytes on either side of the byte range may be returned by the datacenter, whether or not those additional bytes were specified by the request 810. In at least some embodiments, the use of an interface module 308a in the form of a file system driver, such as the FUSE operating system mechanism for example, can be used to specify one or more byte ranges, or other types of data ranges. As the foregoing makes clear, the datacenter can support client requests for mounting a file as that file existed at a particular date/time, and the datacenter can also support block level and byte range requests from the client.

In at least some embodiments, the file system tool at the client may first check the local cache to see if some or all of the bytes in the byte range to be requested are already present locally. By performing this check, the amount of data that may be needed from the datacenter server may be reduced if the local cache already includes some of that data. Moreover, even if this check is not performed, the datacenter can inform the file system tool at the client that at least some of the data in the requested dataset has already been transmitted to the client, and the datacenter can inform the file system tool where else that data appears in the file with which the dataset request is concerned.

After the dataset request is received at the datacenter server, the datacenter server can then search 812 a manifest and table of contents to determine the location of the requested byte range. The datacenter server can then assemble, potentially from multiple incrementals and/or a baseline dataset, and return 814 the requested data to the client. Where the file or other dataset that is mounted on a client device is synthesized from multiple baseline and incremental change sets, that file or other dataset may be referred to as a virtual synthetic. That is, and as noted elsewhere herein, the file that is mounted is synthetic in the sense that the portion is created, or synthesized, on an ad-hoc basis according to user requirements and the file does not exist separately on its own at the datacenter.

In at least some embodiments, the dataset transmitted from the datacenter server to the client is in an encrypted and compressed form so that only an authorized user with an appropriate key is able to access the dataset. In at least some embodiments, access to the dataset can be confined to a particular user and client. Thus, after receipt 816 at the client of the requested byte ranges or blocks, one embodiment of the method 800 includes decryption and decompression of the received data. As well, the data transmitted from the datacenter server to the client may be de-duplicated data. In at least some embodiments, one, some, or all of decryption, decompression, and deduplication can be performed by, or at the direction of, the file system tool.

The received dataset can be stored at the client, in a local cache for example. The storage of the dataset can be performed, for example, by the application in connection with which the request for the dataset was made. Thus, for example, if the request was made for a mailbox, or an individual email, the received dataset can be cached by the file system tool. At 818, the user can perform various file system operations concerning the cached data. As disclosed elsewhere herein, such file system operations can include, for example, reading from, and writing to, the cache. As another example, the user can employ the cached data to boot a virtual machine, as in the case where the cached data relates to a file such as a .VMDK file.

Once the user has completed the process of making changes to the cached data, the changes can then be transmitted 820 to the datacenter server for backup. This backup can be performed with any suitable backup client and backup application, and the data to be backed up can be compressed and encrypted prior to transmission from the client to the datacenter server. The received changes are then backed up 822, in the form of an incremental in at least some embodiments, at the datacenter server. As part of the backup process 822, the client can request creation or modification of the manifest, and the client can also request updates to the table of contents.

The dataset and changes stored in the local cache at the client may remain in that cache after those changes have been backed up at the datacenter server. Where this is the case, the client may be able to access the cached data later in connection with another request for a dataset. After the incremental has been stored 822 at the datacenter server, a table of contents can be created for the incremental, and the manifest updated 824.

F. Aspects of Example Inversion Patch Schemes

Figure 6:
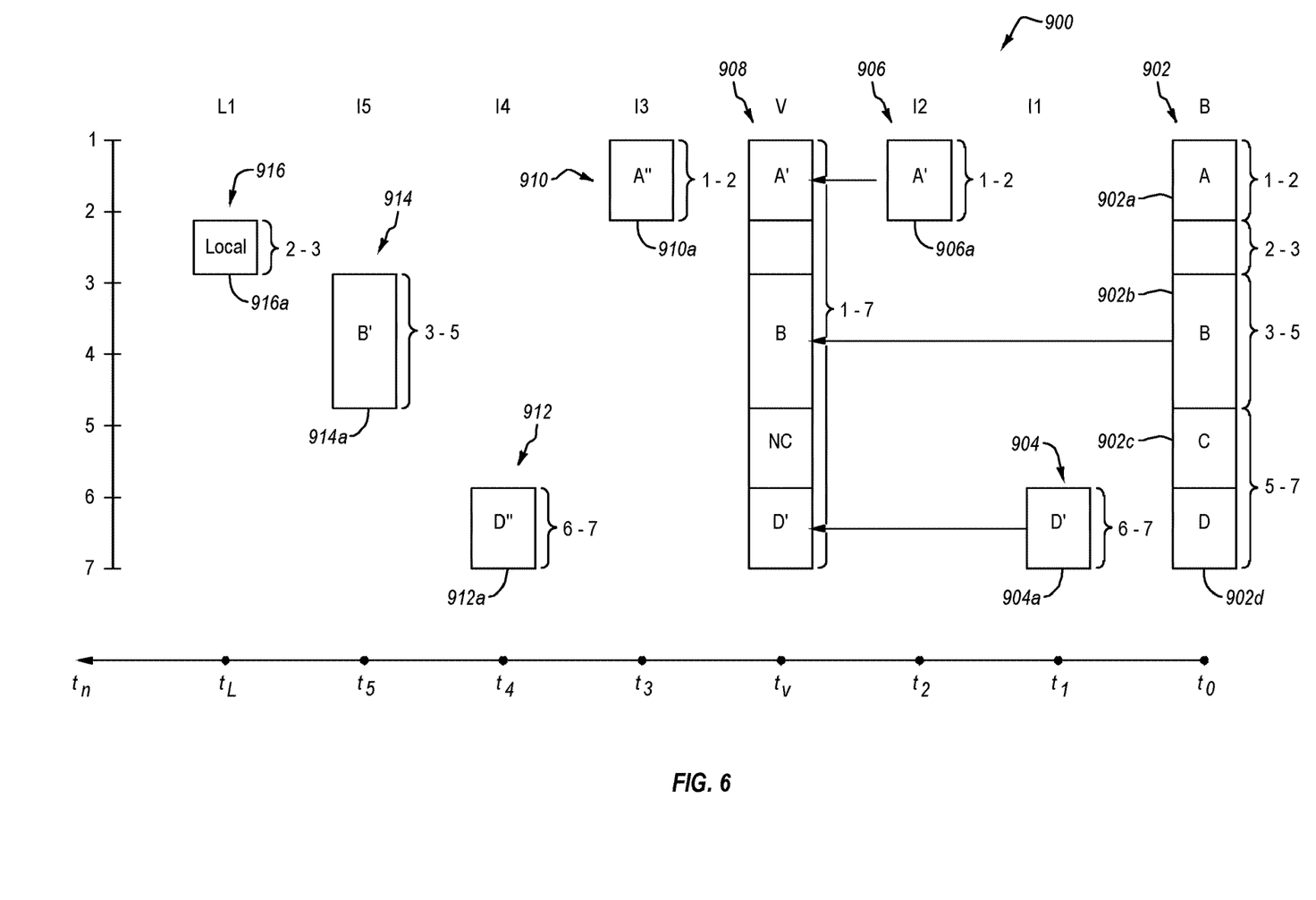
FIG. 6 is a schematic that discloses aspects of a an example scheme for creating an inversion patch.

Directing attention now to FIG. 6, details are provided concerning aspects of an example scheme for creating an inversion patch that is based on information concerning incremental backups of a file, and that can be used to locally restore a particular version of that file. In general, a backup history 900 is depicted that extends over a period of time beginning at $t_0$ and ending at $t_n$. As indicated, a baseline dataset 902 was created at time $t_0$ and, in this illustrative example, includes four blocks 902a, 902b, 902c and 902d, that collectively extend over a data range, which can be a byte range for example, of 1-7. The data range can correspond to particular locations on a storage medium.

In general, one or more incremental backups can be created that include various changes, also referred to as differences, relative to the baseline dataset 902b that is stored locally at a client and/or relative to one or more prior incrementals. It should be noted that as used in this context, the term 'change' is intended to be broad in scope and can, accordingly, constitute addition of data, deletion of data, or modification of the existing data, or any combination of the foregoing. These incremental backups, like the baseline dataset 902b, can be stored in a datacenter, such as the cloud datacenter discussed in connection with FIG. 1 for example.

Turning now to the particular example of FIG. 6, at time $t_1$, an incremental backup I1 904 is created that reflects a change to block 904a in data range 6-7, and at time $t_2$, an incremental backup I2 906 is created that reflects a change to block 906a in data range 1-2. As indicated, the change reflected by block 906a is relative to block 902a of the baseline dataset 902, and the change reflected by block 904a is relative to block 902d of the baseline dataset 902.

Next, at time $t_v$, a particular file version 908 is created locally, and backed up as an incremental at the datacenter, that includes blocks 906a, 902b, 902c and 904a. As discussed in detail below, the file version 908 is the version that is desired to be restored locally. It should be noted that for the purposes of the discussion, the file version 908 is illustrated to indicate the contents of an inversion patch, discussed below, for that file version over the defined range of 1-7, rather than to indicate that changes have necessarily been made in file version 908 regarding that range. In fact, the file version 908 can be, and often is, an incremental that includes one or more changes relative to one or more earlier incrementals and/or relative to the baseline dataset 902.

Various incrementals may be performed subsequent to time $t_v$ as well. Thus, for example, incremental I3 910 is created at time $t_3$ that reflects a change to block 910a relative to block 906a. Similarly, an incremental I4 912 is created at time $t_4$ that reflects a change to block 912a relative to block 904a. As well, an incremental I5 914 is created at time $t_5$ that reflects a change to block 914a relative to block 902b. Finally, one or more local changes, exemplified by local change L1 made at time $t_L$, can also be taken into consideration, notwithstanding that those changes may not yet have been backed up as an incremental at the datacenter. In the particular illustrated example, local change L1 reflects a change to block 916a in range 2-3.

As illustrated by the foregoing, the data ranges affected by the incrementals performed after time $t_v$ are 1-2, 3-5 and 6-7. No changes are made by these incrementals to the data in range 5-6. The foregoing also indicates that embodiments of the invention are also able to track and account for not only incrementals that have been backed up at the datacenter, but also any local changes that have been made to the local version of the file but not backed up, for whatever reason, at the datacenter. Thus, a very accurate picture of the current configuration of the local version can be obtained, thereby enabling a high degree of accuracy in the local file version 908 that is ultimately restored locally. As will also be apparent, and discussed in more detail below, an incremental inversion patch can reflect a synthesis of any combination of baseline data, incremental data, and local data.

It will be appreciated that depending upon the nature of the changes made in connection with the incrementals, the blocks can shift such that the data ranges associated with the various blocks affected by the incrementals can change. However, the locations and offsets of the affected blocks can be tracked using references and respective tables of content for each of the incrementals, as discussed in detail above in connection with FIG. 4. For the sake of simplicity, any such shifts have been omitted from FIG. 6, but it should be understood that shifting may, and likely will, occur in conjunction with the implicit and explicit operations exemplified by FIG. 6.

F. Creating and Applying an Inversion Patch

Figure 7:
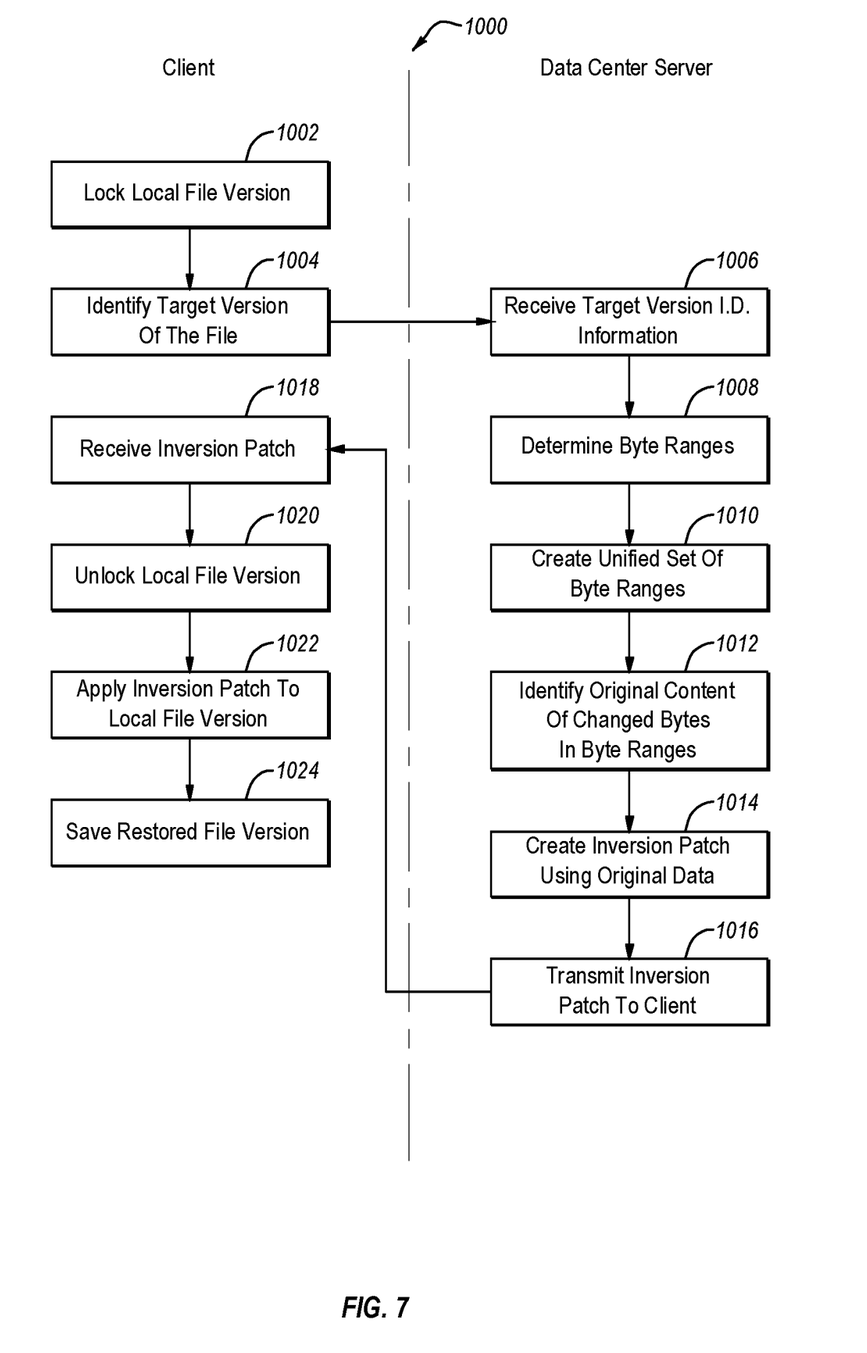
FIG. 7 is a flow diagram disclosing aspects of an example method for creating and applying an inversion patch to locally restore a desired file version.

With continued attention to FIG. 6, and directing attention now to FIG. 7, details are provided concerning aspects of a method, one example of which is denoted at 1000, for creating an inversion patch that can be applied to a local file version so as to roll that local file version back to a desired version that was created prior in time to the local file version. In effect, such an inversion patch, when applied, serves to undo any changes that were made subsequent to the date/time associated with the creation of the desired version. The inversion patch can undo these changes in reverse chronological order starting with the most recent changes, but no particular order is required if redundancies and overlaps have been eliminated during creation of the inversion patch. Application of the inversion patch, and attainment of the desired version, can be effected without the need to transfer or restore the entire file. Moreover, processes for creation and application of the inversion patch are able to leverage information that is already collectively provided in association with embodiments for the creation and storage of the incrementals, such as the location and offsets of the blocks, and their associated data ranges.

As well, it may often be the case that the number of changes that have been implemented in a local file version subsequent to the creation of a desired version of the local file may be relatively small. Thus, relatively little time may be required to identify and obtain the data required for the inversion patch. In this way, a desired file version can be locally restored relatively quickly after an event takes place that necessitated the restoration.

A related advantage is that because the inversion patch may often be relatively small, the data required for the patch can be transmitted quickly and easily over conventional communication lines from the data repository to the client. This can be especially useful where communication time/bandwidth are controlling factors, for example, in a client/cloud datacenter connection/relationship.

With particular reference now to FIG. 7, the method 1000 can begin when a local file version is locked 1002, by creation of a local copy for example, so that it cannot be further modified. The locking 1002 of the local file version can be performed in response to a variety of different events, such as data corruption, data loss, or any other event that causes one or more undesired changes to the data of the local file version. By locking 1002 the local file version, the scope of the inversion patch that will be created is effectively determined, since no further local changes can be made to the local file version, and no further incrementals of the local file version are needed because the local file version cannot be changed in a way that would necessitate the creation and backup of any further incrementals.

Once the local file version 1002 has been locked, a target version of the file can then be identified 1004. In general, the target version of the file is the version that is to be locally restored from the frozen version of the file. In general, a variety of criteria can be used to identify the target version of the file, examples of which include, but are not limited to, the date and time that the target version was created.

Identification 1004 of the target version of the file can be performed by sending a communication from a client to a datacenter, such as a cloud datacenter for example. The communication received 1006 by the datacenter from the client identifies the target version, such as by filename and date for example. The information needed to construct the inversion patch for local restoration of that version can be readily obtained, since the incrementals associated with the target version of the file can reside at the datacenter where the target version information was received. In a case where the local file version includes local changes that have not been backed up, the byte ranges affected by those local changes may also be included as part of the identification 1004 of the target version of the file that is sent to the datacenter.

After receipt 1006 of the target version information at the datacenter, or other data repository, the grouping of applicable byte ranges of the inversion patch is determined 1008. The grouping of byte ranges can include the byte ranges of any local changes, as well as the byte ranges of any incremental backups that were created after the target version of the file and before the local file version was locked. Identification and use of the byte ranges does not require an examination of the actual content of those byte ranges. Rather, it is enough that the byte ranges themselves be identified.

This can be performed, for example, by reviewing the table of contents at the datacenter for each incremental that was created after the target file version. As well, the byte ranges of local changes can be identified by a local operating system, for example. Thus, embodiments of the invention may be advantageous inasmuch as they do not require an examination or analysis of the actual data that was the basis for the incrementals and local changes that occurred subsequent to creation of the target file version.

Once the byte ranges for the inversion patch have been identified 1008, those byte ranges are then combined 1010 into a unified set of byte ranges that collectively embraces all the changes that occurred in the local copy of the file after the creation of the target file version. Next, the original content of each changed byte in the byte ranges is identified 1012. This can be accomplished by searching, in reverse chronological order, the incrementals that were created prior to the target file version. With reference to the particular example of FIG. 6, incremental I2 906 would first be searched, then incremental I1 904 would be searched and, finally, the baseline dataset 902 would be searched. As each block or other piece of original data is located 1012, those blocks are then combined into an inversion patch 1014. This inversion patch, when applied to the local file version stored at the client, serves to roll back that local file version to the target file version.

At 1016, the completed inversion patch can be sent 1016 to the client where it is received 1018 for application to the local file version. Next, the locked local file version is unlocked 1020, and the inversion patch applied 1022 to the local file version. Depending upon when the inversion patch is expected to be applied, the inversion patch can be locally stored at the client for later retrieval and application to the local file version.

Application 1022 of the inversion patch can include various processes. For example, the byte ranges of the local file version respectively associated with the data blocks of the inversion patch can be accessed, and then updated to include the data blocks of the inversion patch. This process can be performed such that changes contained in incrementals created after the desired file version are undone in reverse chronological order, from most recent to least recent. However, because overlapping or redundant parts of the inversion patch are typically eliminated during creation of the inversion patch, it is not necessary in such cases that the changes be undone in any particular order when the inversion patch is applied. Thus, with reference to the example of FIG. 6, the changes associated with L1 would first be undone, followed by the changes associated with incremental I5 914, incremental I4 912, and incremental I3 910, in that order. No change would be made by the inversion patch with respect to range 5-6 since that range was not modified subsequent to creation of the desired file version 908. In some embodiments at least, the local file version is not stored locally until after all of the changes in the inversion patch have been applied. In any event, after all the changes of the inversion patch have been applied, the restored version is then saved 1024 locally at the client.

In some embodiments, the patch inversion functionality can be combined with functionality implemented by embodiments of the file system tool 306a, such as the Data Protection Cloud File System (DPCFS) for example. To illustrate, DPCFS could request the byte ranges of the inversion patch and then access all bytes of the local file which have not changed and request any changed bytes from the data repository, which could be a cloud datacenter. In at least some embodiments, DPCFS works in a hybrid mode, where DPCFS obtains some data from the local disk and some from the datacenter, which can be in the cloud. The ratio of desired bytes, that is, the bytes embraced by the byte ranges, to total bytes (DPCFS) of the file can be multiplied by the ratio of unmodified bytes of the byte ranges to modified bytes of the byte ranges.

As this example illustrates, the operation becomes much more efficient than either technique, that is, DPCFS and patch inversion, operating by itself. Moreover, if the percentage of the whole file that is accessed is larger, only the changed part of that percentage needs to be downloaded. Thus, patch inversions and associated processes can be implemented quite efficiently and may involve very little data transfer between the datacenter and the client.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, at a client where a version of a file is locally stored, an inversion patch concerning the local file version, the inversion patch including original content of one or more byte ranges that embrace changes reflected in the locally stored version of the file version that were made subsequent to creation of a target version of the file with which the locally stored file version is associated;
   unlocking the local file version;
   applying the inversion patch to the unlocked local file version to create a restored file version that matches the target version of the file, wherein applying the inversion patch includes replacing contents of the byte ranges of the local file version with the content of the inversion patch, and replacement of contents of the byte ranges of the local file version with the content of the inversion patch is performed in reverse chronological order, beginning with data of one or more byte ranges that reflect local changes and ending with data of one or more byte ranges from one or more incrementals that were created after the target file version was created; and
   saving the restored file version.

2. The method as recited in claim 1, further comprising locking the local file version prior to receiving the inversion patch, and locking of the local file version determines a scope of the inversion patch.

3. The method as recited in claim 1, wherein replacement of contents of the byte ranges of the local file version with the content of the inversion patch is performed in reverse chronological order so that the replacement incrementally transforms the local file version from a most recent version to the restored file version that matches the target version of the file.

4. The method as recited in claim 1, wherein the content of the inversion patch includes one or both of a local change, and a changed included in an incremental stored at a datacenter remote from the client.

5. The method as recited in claim 1, wherein the patch inversion is applied to the local file version at a block level.

6. The method as recited in claim 1, wherein the local file version is one of a database, a mailbox, or a virtual machine disk file.

7. The method as recited in claim 1, wherein the inversion patch is received from a datacenter that stores one or more incrementals and a baseline dataset associated with the local file version.

8. A non-transitory storage medium having stored therein instructions which are executable by one or more hardware processors to perform operations comprising:
   receiving, at a client where a version of a file is locally stored, an inversion patch concerning the local file version, the inversion patch including original content of one or more byte ranges that embrace changes reflected in the locally stored version of the file version that were made subsequent to creation of a target version of the file with which the locally stored file version is associated;

unlocking the local file version;

applying the inversion patch to the unlocked local file version to create a restored file version that matches the target version of the file, wherein applying the inversion patch includes replacing contents of the byte ranges of the local file version with the content of the inversion patch, and replacement of contents of the byte ranges of the local file version with the content of the inversion patch is performed in reverse chronological order, beginning with data of one or more byte ranges that reflect local changes and ending with data of one or more byte ranges from one or more incrementals that were created after the target file version was created; and saving the restored file version.

9. The non-transitory storage medium as recited in claim 8, wherein the operations further comprise locking the local file version prior to receiving the inversion patch, and locking of the local file version determines a scope of the inversion patch.

10. The non-transitory storage medium as recited in claim 8, wherein replacement of contents of the byte ranges of the local file version with the content of the inversion patch is performed in reverse chronological order so that the replacement incrementally transforms the local file version from a most recent version to the restored file version that matches the target version of the file.

11. The non-transitory storage medium as recited in claim 8, wherein the content of the inversion patch includes one or both of a local change, and a changed included in an incremental stored at a datacenter remote from the client.

12. The non-transitory storage medium as recited in claim 8, wherein the patch inversion is applied to the local file version at a block level.

13. The non-transitory storage medium as recited in claim 8, wherein the local file version is one of a database, a mailbox, or a virtual machine disk file.

14. The non-transitory storage medium as recited in claim 8, wherein the inversion patch is received from a datacenter that stores one or more incrementals and a baseline dataset associated with the local file version.

15. A system, comprising:

one or more hardware processors; and a non-transitory storage medium having stored therein instructions which are executable by the one or more hardware processors to perform operations comprising:

receiving, at a client where a version of a file is locally stored, an inversion patch concerning the local file version, the inversion patch including original content of one or more byte ranges that embrace changes reflected in the locally stored version of the file version that were made subsequent to creation of a target version of the file with which the locally stored file version is associated;

unlocking the local file version;

applying the inversion patch to the unlocked local file version to create a restored file version that matches the target version of the file, wherein applying the inversion patch includes replacing contents of the byte ranges of the local file version with the content of the inversion patch, and replacement of contents of the byte ranges of the local file version with the content of the inversion patch is performed in reverse chronological order, beginning with data of one or more byte ranges that reflect local changes and ending with data of one or more byte ranges from one or more incrementals that were created after the target file version was created; and saving the restored file version.

16. The system as recited in claim 15, wherein the operations further comprise locking the local file version prior to receiving the inversion patch, and locking of the local file version determines a scope of the inversion patch.

17. The system as recited in claim 15, wherein replacement of contents of the byte ranges of the local file version with the content of the inversion patch is performed in reverse chronological order so that the replacement incrementally transforms the local file version from a most recent version to the restored file version that matches the target version of the file.

18. The system as recited in claim 15, wherein the content of the inversion patch includes one or both of a local change, and a changed included in an incremental stored at a datacenter remote from the client.

19. The system as recited in claim 15, wherein the patch inversion is applied to the local file version at a block level.

20. The system as recited in claim 15, wherein the local file version is one of a database, a mailbox, or a virtual machine disk file.

* * * * *